Feb. 13, 1968  F. I. WAKEFIELD  3,368,379
TUBE CLOSING DEVICE
Filed Sept. 17, 1964  2 Sheets-Sheet 2
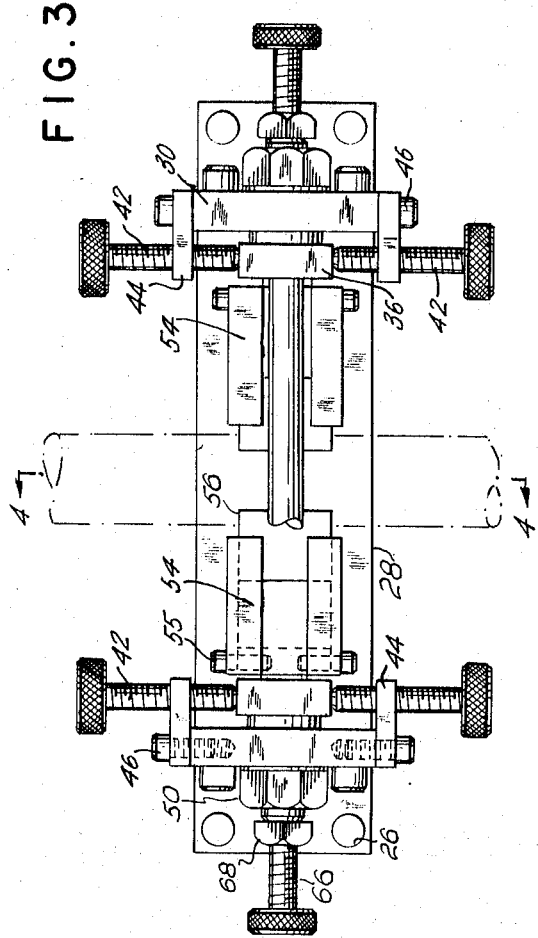
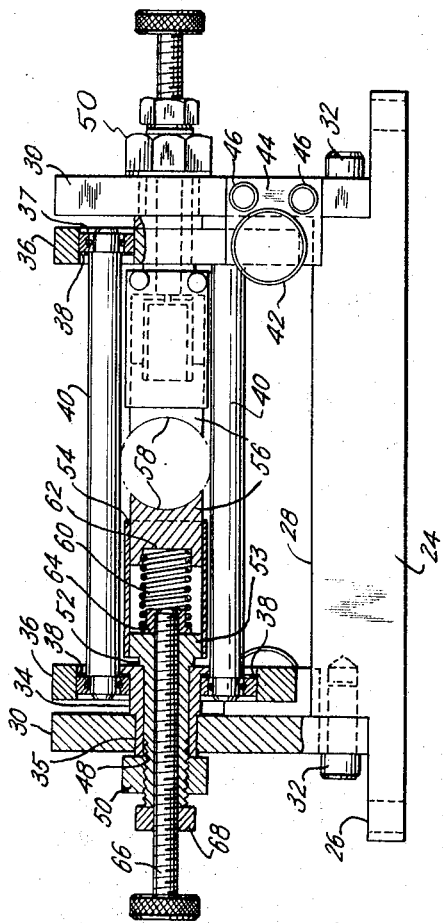
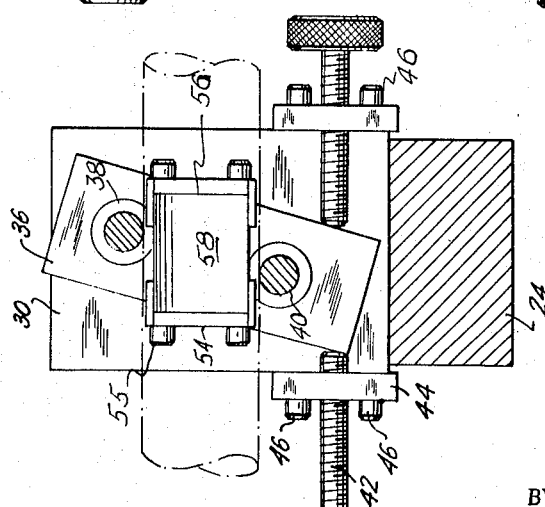
INVENTOR.
FREDERICK I. WAKEFIELD
BY
McLean and Boustead
ATTORNEY

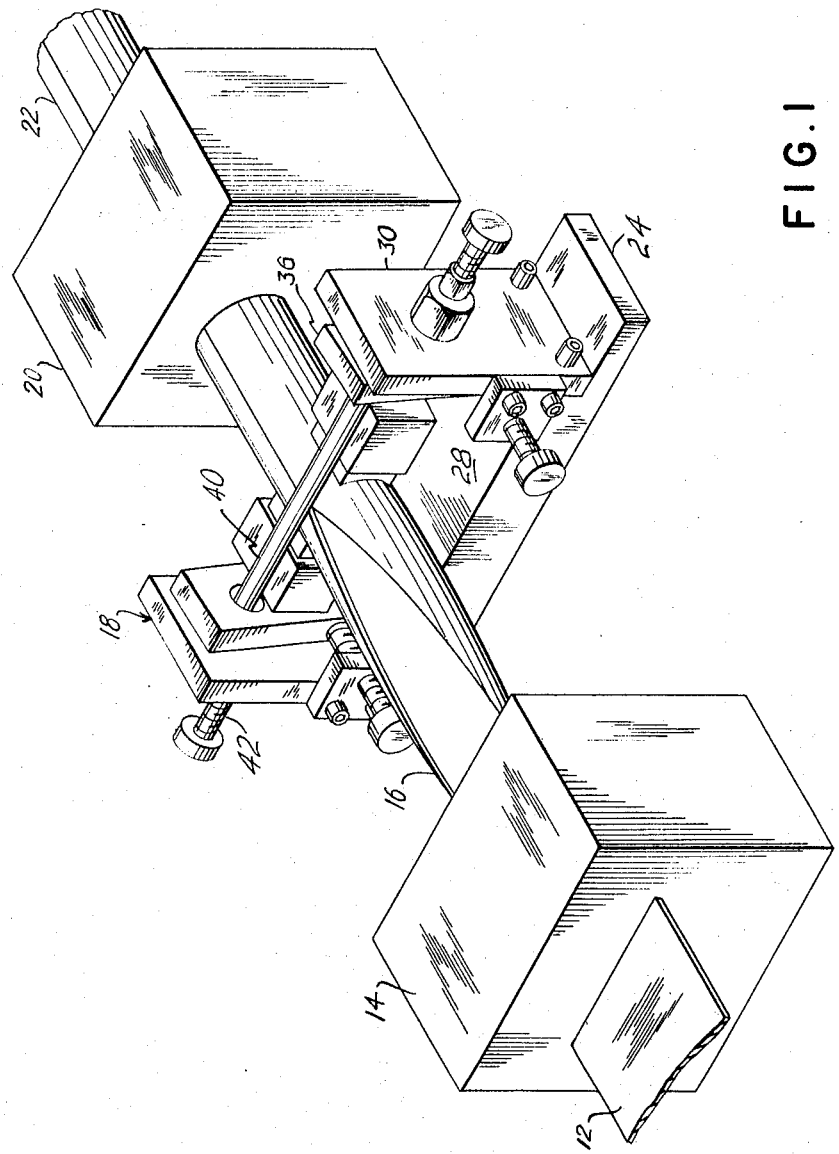

United States Patent Office 3,368,379
Patented Feb. 13, 1968

3,368,379
TUBE CLOSING DEVICE
Frederick I. Wakefield, Durham, N.H., assignor to Simplex Wire and Cable Company, Cambridge, Mass., a corporation of Massachusetts
Filed Sept. 17, 1964, Ser. No. 397,216
7 Claims. (Cl. 72—176)

ABSTRACT OF THE DISCLOSURE

A tube closing device is disclosed for continuously affecting final closure of a partially formed tube which consists of a pair of parallel positioning rollers located transversely to the axis of the tube formation at a distance from that axis equal to the outer radius of the closed tube, and a pair of tube closing carbon blocks having confronting concave surfaces and spring loaded to exert a constant inward pressure against the sides of a partially formed tube causing closure thereof.

---

My invention pertains to tube forming and in particular to an apparatus for use in the final forming stage of a process for making tubing from a flat strip of material.

Although many varied uses for the apparatus of my invention will be apparent it was developed for use in the forming of dead-soft aluminum tubing as a step in the manufacture of aluminum sheathed cable, and I will therefore describe it herein with reference to that application.

The forming of a tube from a flat strip of aluminum is generally accomplished by a process disclosed in Lehnert Patent No. 3,023,300 which involves passing an indefinite length of the flat strip through successive bending operations in which the strip is progressively folded from a flat cross-section to a circular cross-section, such that the longitudinal edges of the strip are folded toward each other into butting relationship, the longitudinal seam of the tube formed thereby then being welded or otherwise sealed.

In order to obtain the mechanical and electrical characteristics required in the final product the tube must be fabricated within narrow standards of uniformity. Thus, it is important that the seam pass directly under the welding torch and that the butting edges remain always in such relationship. To realize this uniformity it is necessary to perform the welding operation in very close proximity to the final tube closing operation. This, however, imparts considerable heat to the tube during the final tube closing operation, and, thus, the apparatus used to effect closure must be capable of withstanding high temperatures.

During the preliminary bending steps, since the longitudinal edges of the strip are not at that point in butting relationship, they can be located and maintained in position with relative ease. An apparatus frequently used for this preliminary bending consists of a pair of rollers having confronting edges in close proximity to each other, the area between them defining the shape which it is desired to impart to the tube.

The final closing step, however, is more difficult since slight variations in the pressure exerted on the tube can force the edges out of butting relationship. Squeeze sheaves used in cooperating pairs and also dies have heretofore been employed in this step. In the case of squeeze sheaves eccentricity in the sheaves causes variations in the squeeze force as the sheaves rotate, and non-uniformity in the configuration of the grooves causes rotation of the formed tube and consequent rotary movement of the seam away from the welding torch. On the other hand, use of the die often abrades the surface of the tube and requires a strong pull on the formed tube to overcome friction. The resultant tension often stretches the tube introducing non-uniformities in the cross section and in some cases even causes rupture of the tube. Dies made from various materials have been tried but materials which do not abrade the tube and withstand the heat, are subject to such rapid wear that economic use is impossible.

The object of this invention, therefore, is to furnish an apparatus to effect the final closure of a partially formed tube without the above mentioned disadvantages and which insures uniformity in the final product.

Another object of this invention is to furnish a tube closing apparatus which can be quickly and economically adjusted to effect closure of tubes of varying diameter within a reasonable range.

A further object of this invention is to provide a method of forming a tube from a flat strip of tubing material without non-uniformities inherent in present day processes.

These and other objects I accomplish by passing a partially formed tube between squeeze blocks that apply a force along the sides of the partially formed tube forcing the longitudinal edges of the tube together and fixing the final cross-section of the tube. It will be understood that by "partially formed tube" I refer to a strip of an indefinite length of material from which the tube is to be formed which has been acted upon to bend it from a flat shape to a shape of arcuate cross-section such that further bending about a longitudinal axis will bring the longitudinal edges of the strip together forming the strip into tubular shape.

The squeeze blocks used have confronting concave parti-cylindrical faces shaped to fit the outside contour of the tube so that they contact the tube along a given length except at the top and bottom. The squeeze blocks are preferably made of carbon which does not mark the soft aluminum and can withstand the high temperature caused by the proximity of the welding torch. To compensate for wearing of the carbon while maintaining a constant squeeze on the tube over an extended period of time the blocks are slidably mounted under spring pressure.

The tube is positioned vertically between the squeeze blocks by rollers which tangentially contact the tube and give it support against collapse due to the force of the squeeze blocks on its sides. Small diameter rollers are used to minimize the effects of eccentricities and also to make it possible to position the welding torch close to the point where the edges of the strip first meet. The use of relatively long rollers avoids adverse heating of the bearings in which the rollers are mounted.

Thus, I accomplish final closure of a partially formed tube without the disadvantages inherent in present day processes.

For a further description of my invention reference is made to the appended drawings in which:

FIGURE 1 is an oblique view of an apparatus according to the present invention as used in a tube forming line;

FIGURE 2 is an elevation partly in section of an apparatus according to the present invention;

FIGURE 3 is a plan view of the apparatus of FIGURE 2; and

FIGURE 4 is a sectional view taken along lines 4—4 in FIGURE 3.

Referring more particularly to FIGURE 1 a flat aluminum strip 12 is passed through a preliminary bending step 14 wherein the longitudinal edges are bent upward to produce a partially formed tube 16. This partially formed tube 16 is then passed through a final closure apparatus 18 an a welding apparatus 20 from which a finished tube 22 is drawn. Since the apparatus used in the preliminary bending and the welding steps can be any of the presently used and commercially utilized types, these apparatuses are depicted generally in FIGURE 1.

In FIGURES 2, 3 and 4, the final closure apparatus 18 of my invention is shown in more detail. The structure is symmetrical about a vertical plane through the axis of the tube forming line and will be described using the same reference numerals for corresponding parts. The structure is supported on a flat, elongated, rectangular base 24 having a hole 26 at each corner for fastening the apparatus to a work bench or other suitable support. In the center of base 24 there is a raised portion 28 to the opposite ends of which two vertical plates 30 are secured parallel to each other by four screws 32.

A large hollow bushing 34 extends through a hole 35 in the upper center of each plate 30, holes 35 being aligned on an axis parallel to base 24. The inner end of each bushing 34 carries affixed to it a rectangular block 36 which acts as a bearing bracket for two horizontal rollers 40 which are supported between the pair of blocks 36. Two bearings 38 are imbedded in each rectangular block 36 positioned to hold the pair of adjacent ends of rollers 40 parallel to base 24 and equidistant from the axis of bushings 34. Bushings 34 can be rotated in holes 35 thereby rotating blocks 36 and changing the vertical distance of each roller 40 from the axis of bushings 34 while keeping them always vertically equidistant from said axis. The rotation of bushings 34 and blocks 36 can be prevented by four positioning bolts 42 which extend through four tapped support plates 44 such a plate 44 being secured to each side of each of vertical plates 30 by a pair of screws 46. Positioning bolts 42 are loosened while rollers 40 are properly positioned and then tightened until they engage the sides of blocks 36.

A smaller hollow bushing 48 extends through the center of each of bushings 34 and carries a hex nut on its threaded outer end. On its inner portion each bushing 48 has a shoulder 52 which engages bushing 34 as nut 50 is tightened to permit bushing 48 to be secured to bushing 34. Immediately adjacent shoulder 52 each bushing 48 terminates in a square end flange 53. A pair of channel-shaped guide brackets 54 are attached to opposite sides of each end of flange 53, such that the ends of brackets 54 fit snugly over each flange end 53, embracing it on all edges without joining in the center, and are held in place by suitable screws 55. Each pair of guide brackets 54 cooperates to form a hollow passageway 57 extending away from bushing 38 having a constant cross-sectional area equal to the cross-sectional area of end flange 53. Each passageway acts as a guide for a carbon block 56 having a cross-sectional area very slightly less than that of the passageway 57 so that block 56 is free to move horizontally within its associated passageway 57.

On the end of each carbon block 56 facing end flange 53 a centrally located recess 62 in block 56 receives a spring 60 for imparting a positive force to the carbon block urging it towards the center of apparatus 18. The end of spring 60 adjacent flange 53 is held in place by a collar 64 positioned on the end of a bolt 66 which threadedly penetrates the interior of bushing 48. The position of collar 64 in passageway 57 can be changed by turning bolt 66, and when it is desired to prevent such movement a hex nut 68 on the outer portion of bolt 66 is tightened against the external face of bushing 48. By changing the position of collar 64 the positive force on carbon blocks 56 can be adjusted.

The central confronting faces of carbon blocks 56 are concave with parti-cylindrical shape, each such face including less than a semi-cylinder. The diameter of such parti-cylindrical faces can be changed by merely inserting a different pair of carbon blocks 56 having concave faces of the desired shape. It is important that the top or bottom edges of carbon blocks 56 do not join when the faces are coaxially positioned as the apparatus depends on horizontal movement of the blocks under the force of the springs 60 to compensate for wearing of the carbon.

In operation the outside diameter of the tube to be formed is determined. As an aid to uniformity, standard tubes of various outside diameters are kept at hand for use as samples. Carbon blocks having concave faces conforming to the outside surface of the selected sample are inserted in each passageway 57 and the spring tension on either side is adjusted to maintain the proper force on each carbon block. This force will vary with the type and thickness of material to be used in the tubes formed but it should be no greater than that necessary to cause the longitudinal edges of the partially formed tube to assume a butting relationship.

Next, the rollers 40 are positioned so that vertical displacement of each from the axis of the cylinder generated by the concave faces 58 is equal to one half the outside diameter of the tube to be formed. In accomplishing this step, which, as explained above, is done by loosening screws 42 and rotating bearing blocks 36 it is entirely likely that the interior bushings 48 and thus the carbon blocks 56 will be rotated also. Any movement that does occur can be corrected after screws 42 have been retightened and proper alignment can be checked by inserting the tubing sample between the concave faces 58 and checking for level. Once the machine is adjusted to the satisfaction of the operator the hex nuts 50 and 68 are tightened and the apparatus is ready for use in tube forming.

The partially tubular formed strip 16 from preliminary bending apparatus 14 is passed between concave faces 58 where the longitudinal edges of the strip are forced into butting relationship and the seam of the tube thus formed is welded. The finished tube 22 is then checked for roundness and to confirm that the edges of the seam are in perfect butting relationship. Some minor adjustments may be required if any irregularities are found. For example, the spring tension may have to be increased to compensate for a wide seam. These corrections will be immediately obvious to an operator with ordinary skill in handling machines of this type.

While I have described my invention with reference only to the forming of aluminum tubes it is not intended to be so limited. I anticipate forming tubes of other materials, for example copper, using the method and apparatus of my invention. Also, my invention can be used in the forming of tubes about a core or a group of wires. These and other uses of my invention can be accomplished by making minor adjustments of the apparatus.

Although I use carbon blocks under spring pressure in the formation of soft aluminum tubes, I anticipate using blocks made from other materials limited only by the requirements of ability to withstand high temperature and compatibility with the material of the tube to be formed. Further, where the material is not subject to rapid wear, as in the case with carbon, I anticipate omitting the springs from behind the blocks. In that case I would make some provision for adjusting the position of the blocks within the guides.

I claim:

1. A tube closing device for continuously effecting final closure of a partially formed tube passed therethrough which includes: first and second positioning means disposed on opposite sides of and generally transverse to the axis of the tube to be closed at a distance from that axis equal to the desired outer radius of the closed tube, first and second closing blocks having parti-cylindrical concave confronting faces disposed along the axis of the tube to be closed, which faces are diametrically opposed, each face defining a portion less than 180° of a cylinder generated with a radius equal to the desired outside radius of the closed tube and being positioned coaxially with respect to said axis of the tube to be closed, said first and second closing means being disposed intermediate said zrst and second positioning means.

2. A tube closing device according to claim 1 in which said first and second positioning means are a pair of parallel rollers.

3. A tube closing device according to claim 1 in which said first and second closing blocks each includes resilient means urging said faces toward each other.

4. A tube closing device according to claim 1 in which said first and second positioning means are a pair of parallel rollers supported at their ends in bearing brackets.

5. A tube closing device according to claim 1 wherein said tube closing blocks are carbon blocks.

6. A tube closing device according to claim 3 wherein said tube closing blocks are carbon blocks.

7. A tube closing device according to claim 4 wherein said tube closing blocks are carbon blocks.

References Cited

UNITED STATES PATENTS

| | | | |
|---|---|---|---|
| 3,001,569 | 9/1961 | Gradt | 72—176 |
| 3,159,199 | 12/1964 | Ruple | 80—178 |
| 3,236,083 | 2/1966 | Linderoth et al. | 72—176 |

CHARLES W. LANHAM, *Primary Examiner.*

H. D. HOINKES, *Assistant Examiner.*

UNITED STATES PATENT OFFICE
CERTIFICATE OF CORRECTION

Patent No. 3,368,379                      February 13, 1968

Frederick I. Wakefield

It is certified that error appears in the above identified patent and that said Letters Patent are hereby corrected as shown below:

Column 2, line 68, "an" should read -- and --. Column 4, line 71, "means" should read -- blocks --; line 72, "zrst" should read -- first --.

Signed and sealed this 14th day of October 1969.

(SEAL)
Attest:

Edward M. Fletcher, Jr.

Attesting Officer

WILLIAM E. SCHUYLER, JR.

Commissioner of Patents